United States Patent [19]
Paintin

[11] 3,735,950
[45] May 29, 1973

[54] HANGER ASSEMBLY FOR AUTOMOBILE EXHAUST SYSTEMS

[76] Inventor: John D. Paintin, 8125 Dearborn, Prairie Village, Kans.

[22] Filed: June 28, 1971

[21] Appl. No.: 157,337

[52] U.S. Cl.................248/62, 248/74 R, 248/316, 248/317, 180/64 A
[51] Int. Cl................................................F16l 3/02
[58] Field of Search.........................248/62, 54, 201, 248/72; 180/64 A

[56] References Cited
UNITED STATES PATENTS

| | | | |
|---|---|---|---|
| 2,981,351 | 4/1931 | Knickerbocker | 248/54 R X |
| 3,292,887 | 12/1966 | Cassel | 248/60 |
| 3,270,992 | 9/1966 | Cassel | 248/60 |

*Primary Examiner*—Roy D. Frazier
*Assistant Examiner*—Rodney H. Bonck
*Attorney*—Lowe, Kokjer, Kircher, Wharton & Bowman

[57] ABSTRACT

An attachment for installation of automobile exhaust system replacement components comprising a baseplate configured to be bolted to the frame mounted hangar bracket. The base plate has a hook depending from one edge with an arcuate upper surface adapted to receive the bight of a U-clamp with the legs thereof extending downwardly from the hook. The replacement components are installed between the clamp legs from below and the clamp is closed below the components to secure the latter to the vehicle frame.

3 Claims, 4 Drawing Figures

Patented May 29, 1973
3,735,950
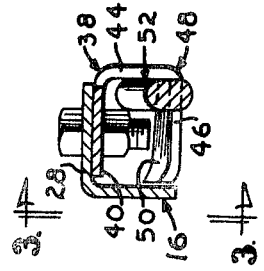
Fig. 2.
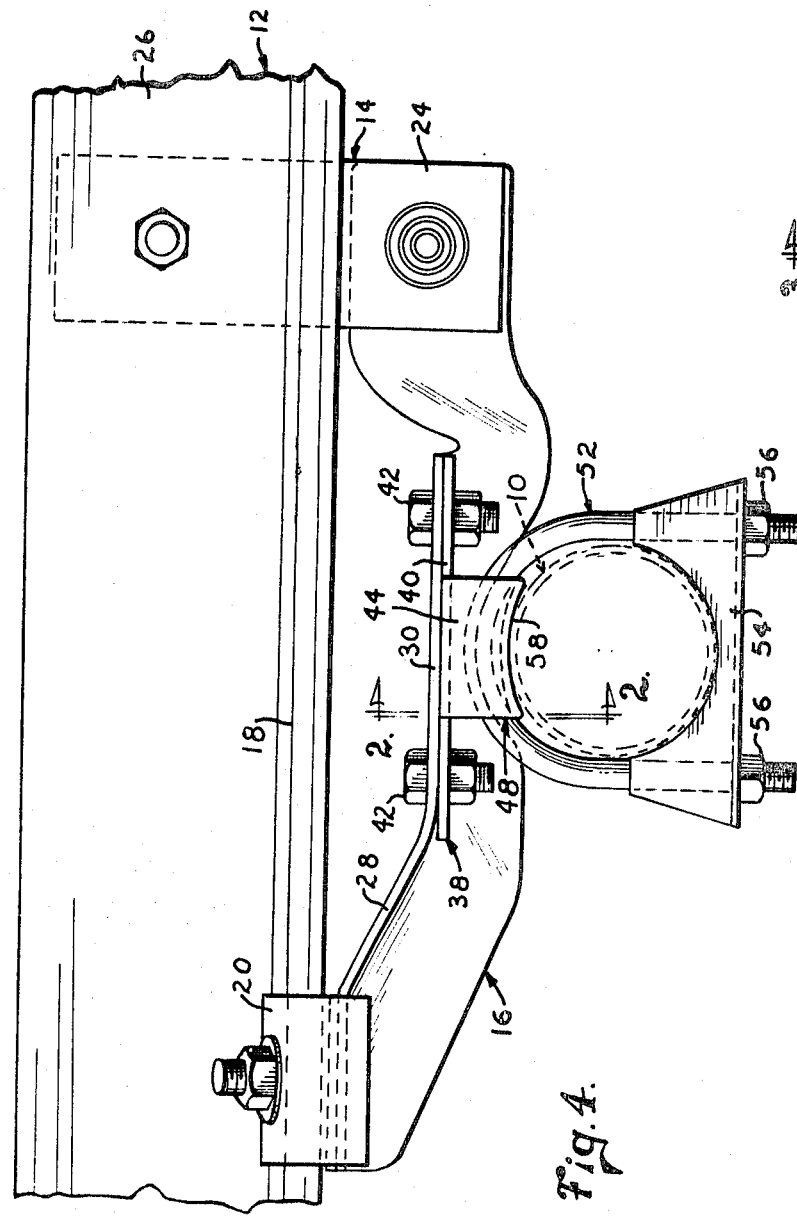
Fig. 1.
Fig. 3.
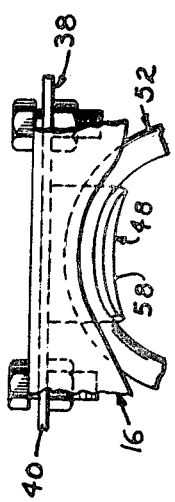
Fig. 4.
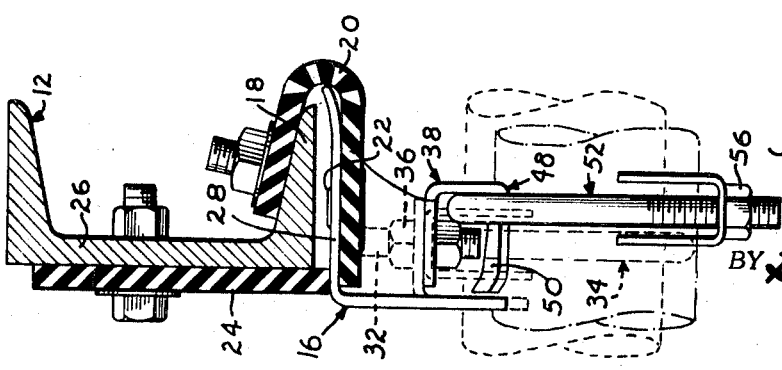
John D. Paintin
INVENTOR.
BY Bradley and Wharton
ATTORNEYS

HANGER ASSEMBLY FOR AUTOMOBILE EXHAUST SYSTEMS

This invention pertains to automotive equipment, and more particularly, to a method and apparatus for facilitating the replacement of muffler or other automotive exhaust system components.

One difficult, time consuming and therefore expensive task associated with the replacement of exhaust system components is the clamping of the components to the vehicle frame. This task has become markedly more difficult in recent years as a result of steps taken by certain automobile manufacturers to reduce the costs of manufacturing their automobiles.

Formerly, automobile exhaust systems were secured to the vehicle frame with clamps which were accessible from beneath the automobile. This permitted a workman ready access to the clamps from beneath the automobile to replace the components when they became worn or damaged. Some automobile manufacturers still follow this practice.

However, since the original exhaust systems are often installed on the vehicle frame before the body is mounted on the chassis, some manufacturers have discovered that considerable economies may be achieved if the workmen are permitted to secure the components to the frame from above the latter as the chassis moves along the vehicle assembly line. This is accomplished by directing the legs of the conventional U-clamps used to secure the components upwardly through a frame mounted hangar bracket with the closed, bight portion of the clamp passing beneath the components. With the clamp in this inverted position, and with no vehicle body on the chassis to limit access to the upwardly directed, threaded clamp ends, the workman can quickly and easily install the nuts on the clamp ends to secure the components to the frame. Obviously, the unimpeded access to the clamps from above permits use of air operated wrenches and other power tools as may be required.

This practice of securing the exhaust system components from above complicates the problems associated with their replacement. Once the vehicle body is mounted on the chassis, access to the clamps from above is terminated. Insufficient room between the vehicle body and the upper ends of the clamps severely hampers the replacement installation operation. While it usually is not impossible for a workman, working from beneath the vehicle, to manipulate tools necessary to tighten the nuts on the clamps once the new components are in place, the limited space makes the procedure extremely time consuming, difficult, and often results in injury to the workman. This becomes a problem of substantial magnitude for shops which specialize in exhaust system or muffler replacement.

Accordingly, it is a primary object of this invention to provide structure which permits quick and facile replacement of exhaust system components for vehicles originally having inverted clamps.

It is also an object of the invention to provide structure of this type which eliminates the necessity for manipulation of tools in the limited space between the vehicle frame and the body and which permits use of conventional power tools to effect the replacement operation.

Still a further object of the invention is to provide apparatus capable of achieving the foregoing objects, yet which permits use of conventional clamps and hangar brackets, thus obviating the necessity for stocking a variety of replacement clamps and brackets.

Another very important object of the invention is to provide structure for easy and economical replacement of exhaust system components for automobile initially having inverted clamps, yet which structure does not diminish the strength of the completed assembly.

A further object of this invention is to provide a method for quick and easy installation of replacement exhaust system components for vehicles originally having inverted clamps, yet which method may be carried out by relatively unskilled workmen utilizing only ordinarily available tools and equipment.

These and other important aims of this invention will be further explained or will be apparent from the claims, drawing and specification.

In the drawing:

FIG. 1 is a fragmentary, side elevational view of a vehicle frame member showing an exhaust system component mounting assembly equipped with an attachment constructed pursuant to the principles of this invention;

FIG. 2 is a cross-sectional view taken along lines 2—2 of FIG. 1;

FIG. 3 is a fragmentary, side elevational view of the attachment taken along lines 3—3 of FIG. 2 and looking in the direction of the arrows; and FIG. 4 is a vertical, cross-sectional view through the vehicle frame member, with the attachment of this invention appearing in elevation, the exhaust system component appearing fragmentarily in dot dash lines and the original position thereof appearing fragmentarily in dash lines.

Referring initially to FIG. 1, the automobile exhaust system component 10 (dash lines) is secured to the vehicle frame 12 by a hanger bracket 14. Bracket 14 is normally installed on the vehicle at the time of its manufacture. Bracket 14 includes an elongated, irregular rigid bar 16 secured to the generally horizontal flange 18 of frame member 12 by elongated flexible strap 20. One end of strap 20 is secured to bar 16 by rivet means 22 and the other end of strap 20 is bolted to flange 18 as shown in FIGS. 1 and 4.

Similarly, the opposite end of bar 16 is riveted to an elongated flexible strap 24 which is, in turn, bolted to the web 26 of frame member 12.

Bar 16 is provided with an upper flange 28 having a portion 30 thereof extending substantially horizontally. This flange portion 30 is normally provided with a pair of spaced apart holes (not shown) which receive the upwardly extending free ends 32 (FIG. 4) of a U-clamp 34. The U-clamp is installed with its lowermost or closed bight segment underlying the exhaust system component secured to the vehicle so that the fasteners 36 may be quickly and easily installed by the assembling workman from above the hangar. The approach from above the hangar assembly is possible, of course, only during the assembling operation at a time which the body has not yet been installed on the vehicle chassis. The upwardly extending legs are thus readily accessible for the workman to install the nuts or fasteners to secure the exhaust system components to the vehicle frame.

Rust, corrosion and other deterioration usually dictates that the exhaust system clamps be removed by cutting or other techniques which may destroy the clamps. This is particularly a likelihood when the U- clamps for the system are installed in the inverted position illustrated in phantom in FIG. 4. Once the vehicle body has been installed on the chassis, there is not sufficient space above the clamps to permit ready accessibility to the workman for manipulating the tools necessary to remove the nuts 36.

The attachment of this invention which permits installation of replacement exhaust system components from below is broadly designated by the reference numeral 38. Attachment 38 includes an elongated substantially rectangular horizontally disposed baseplate 40 adapted to complementally embrace the lowermost surface of the flange portion 30 of bar 16. To this end, plate 40 is provided with a pair of spaced apart holes disposed to register with the holes of portion 30 which received the spaced apart ends of U-clamp 34 in the initial position of the latter. Thus, attachment 38 may be quickly and easily secured to hangar bracket 14 by means of bolts 42 as shown in the drawing. Manifestly, the bolts may be passed through the aligned holes with the nuts for the bolts disposed beneath the baseplate 40 of attachment 38 so that the nuts are readily accessible for manipulation to a workman from beneath the assembly.

It may be seen particularly from FIGS. 1 and 2 that attachment 38 includes a downwardly extending first leg 44 and a horizontally extending second leg 46 of a substantially J-shaped hook 48 carried by baseplate 40. Preferably, leg 44 is integral with plate 40 at one edge of the latter and depends from the baseplate intermediate the holes adapted to accommodate bolts 42. This insures ample room for accessibility of the bolts from beneath the assembly.

The laterally projecting leg 46 is preferably integral with leg 44 and may be provided with an arcuate upper surface 50. Further, the extreme outermost edge of leg 46 may be tipped upwardly (FIG. 3).

The use of attachment 38 will be, it is believed, obvious to those skilled in the art from the preceding description.

The method of replacing exhaust components of vehicles of the type described with the attachment of this invention includes as a first step the removal of the originally installed, inverted U-clamps. This frees the exhaust system component or components to be replaced so that they may be readily removed. This also leaves the spaced apart holes in bracket bar 16 open to receive the bolts 42. Attachment 38 is installed as shown in the drawing and bolted to the undersurface of bar portion 30 with the J-shaped hook depending from baseplate 40 and leg 46 thereof extending in generally spaced parallelism below the baseplate.

Either the original U-clamp, or if such is destroyed in the removal operation, then a new U-clamp is hooked over the hook 48 as shown in the drawing. If desired, or if insufficient space remains between the projecting end of leg 46 and the proximal portion of bar 16, one end of the clamp may be passed between the hook and the baseplate.

The hook supports the bight of the clamp (designated 52 in the drawing). The clamp is supported by the hook in a position reversed from the original disposition and with the legs of the clamp extending downwardly.

The next step contemplates installation of the replacement component for the exhaust system between the spaced apart downwardly directed legs of the clamp and from a position below the latter. Once the replacement component is in position between the legs of the clamp, the clamp keeper 54 can be easily installed beneath the component and on the legs of the clamp. The nuts 56 for the clamp assembly are readily accessible beneath the vehicle and can be quickly and easily tightened by power operated tools or otherwise. This firmly secures the component to the vehicle frame and, of course, permits ready removal and subsequent installation of any further replacement components.

It is to be pointed out that the lowermost surface 58 of the projecting leg 46 of the J-clamp is generally arcuate for embracing the upper surface of the exhaust system replacement component as illustrated in FIG. 1. This embracing relationship between the hook surface and the component insures a firm clamping of the component in its proper position in the assembly.

While a variety of means could be used for securing the attachment 38 to the hangar bracket, it is contemplated that the spaced apart holes in the baseplate thereof will be positioned for registering with the clamp leg mounting holes of the bracket. Manifestly, several holes could be provided in the baseplate to render the attachment adaptable for more than one type of car or, the holes in the baseplate could be elongated for universal application.

Having thus described the invention, what is claimed as new and desired to be secured by Letters Patent is:

1. An attachment to permit inverting the legs of an exhaust system U-clamp to facilitate replacement of system components, said legs initially extending upwardly through a pair of spaced apart holes in a frame mounted hangar bracket having a pair of spaced apart holes receiving the spaced legs of the U-clamp when the latter is in its initial position, the attachment comprising:

a member comprising an elongated plate having a pair of holes registering with the holes of the bracket;

bolt means extending through the holes of the plate and adapted to be received through the holes of the bracket to secure the plate to the bracket; and hook means carried by the member, disposed intermediate the bolt means and having proximal ends terminating in spaced relationship from the corresponding bolt means to permit ready access to the latter, said hook means depending from the member in disposition to receive the bight portion of the clamp over the hook means with the clamp legs extending downwardly, whereby replacement components may be installed between said legs from below the latter.

2. The invention of claim 1, wherein said hook means includes a first leg integral with the plate at one edge of the plate and depending therefrom, and a second leg integral with the first leg and extending substantially normal thereto, whereby said bight may be received over said second leg between the second leg and the plate.

3. The invention of claim 2, wherein said second leg is provided with an arcuate uppermost surface.

* * * * *